May 17, 1949.   S. J. LEVINE   2,470,503
AUTOMATIC INVERSE MODULATION VALVE
Filed Sept. 7, 1946
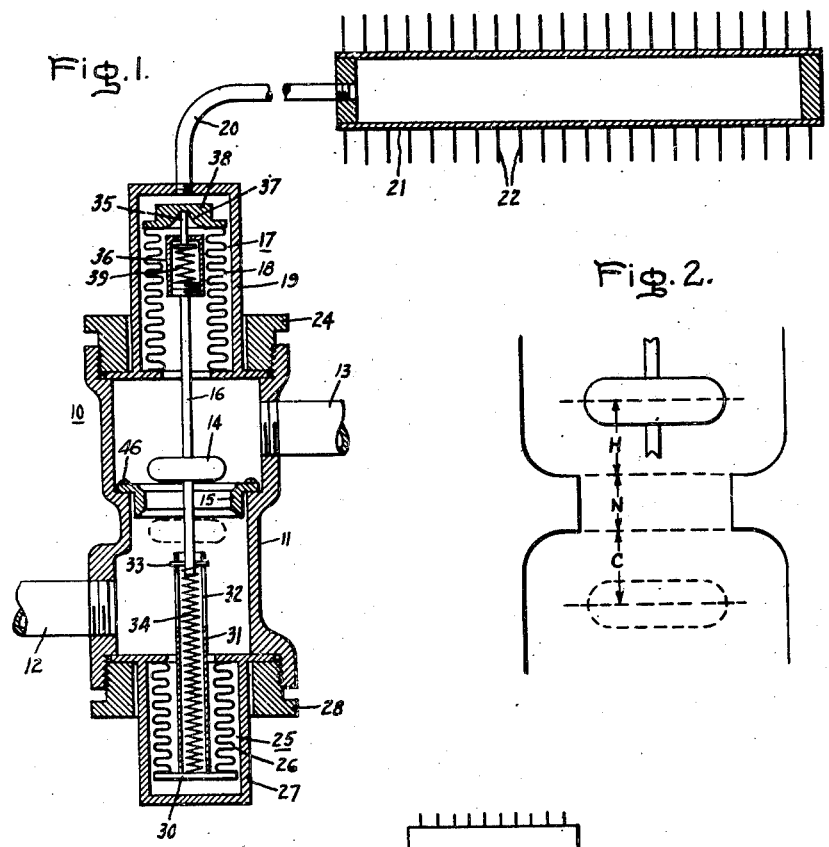
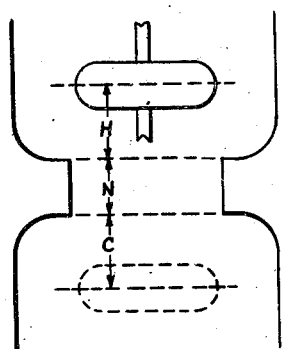
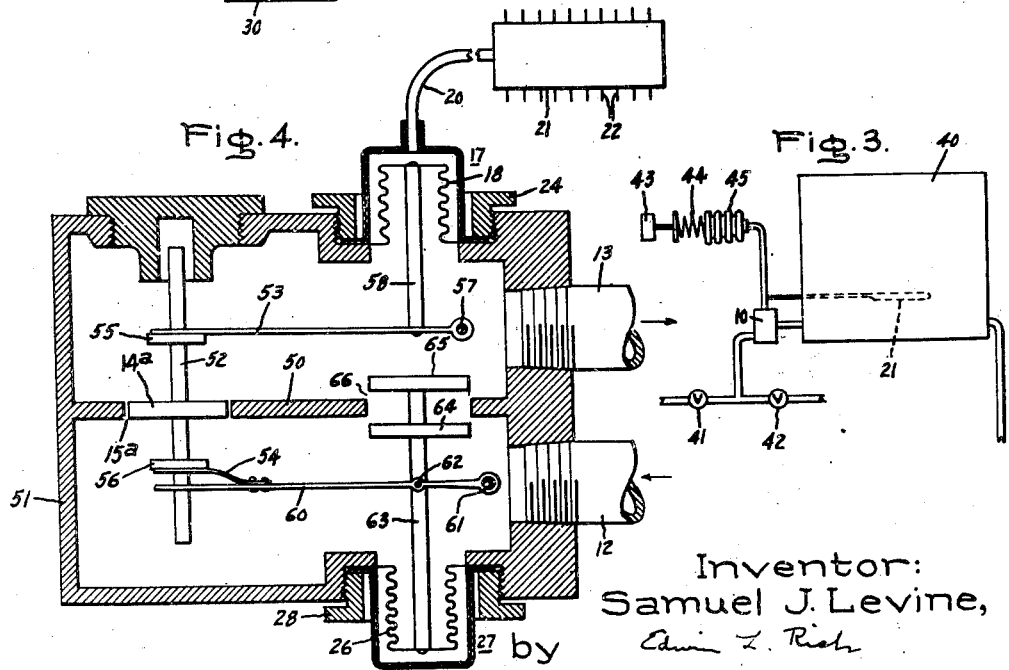
Inventor:
Samuel J. Levine,
by
His Attorney.

UNITED STATES PATENT OFFICE 2,470,503

AUTOMATIC INVERSE MODULATION VALVE

Samuel J. Levine, West Orange, N. J., assignor to General Electric Company, a corporation of New York Application September 7, 1946, Serial No. 695,535

8 Claims. (Cl. 236—1)

The invention relates to automatic inverse modulation valves and particularly to thermostatic valves suitable for reverse or opposite modulation control service under reverse or opposite heat exchange conditions.

In the room heating or cooling system disclosed in the Crago Patent 2,121,625, a flow regulating valve is thermostatically controlled in the winter to increase the flow of heating medium to a room heat exchange unit as the room temperature decreases but the thermostatic flow modulating action is automatically inverted or reversed when cooling medium is supplied to the unit in the summer so as to decrease the flow of the cooling medium as the room temperature decreases.

The present invention provides automatic inverse throw valve improvements that are particularly advantageous in a thermostatic valve for controlling a temperature condition dependent at one time upon a heat loss and at another time upon a heat gain and requiring inverse modulation of the flow of heating and cooling medium to a reversible heat exchange unit or in other similar condition responsive inverse modulation service.

One of the objects is to provide an improved form of automatically operated through-throw valve having inverse flow modulating actions in different ranges of relative movement of the valve members in the same direction in response to corresponding variations in a control condition.

Another object is to provide for varying the ranges of reverse flow modulating movement of the valve members so as to correspondingly shift the response ranges of the automatic condition responsive valve actuating device.

Another object is to automatically limit the range of automatic condition responsive relative movement of the valve members so as to selectively prevent one of the opposite flow modulating actions thereof in response to a predetermined variation in another condition.

Another object is to provide for automatically reversing the valve modulation by opening the valve upon automatic relative movement of the valve members each way from a central closed position in response to opposite variations of a controlling condition.

Another object is to provide improved automatic means for variably by-passing the automatic inverse modulation valve only when the valve becomes closed or substantially closed.

Further objects and advantages provided by the present invention will appear in the following description of the accompanying drawing in which Fig. 1 is a sectional view of an automatic thermostatically actuated reversible modulation valve embodying the improvements of the invention in a preferred form; Fig. 2 is a chart indicating the neutral or closed range N of the valve intermediate the opposite heating and cooling modulation ranges H and C; Fig. 3 is a schematic view of a room heating and cooling heat exchange unit partly in section to show the unit equipped for operation under the control of the improved valve structure shown in Fig. 1 under both heating and cooling conditions; and Fig. 4 is a sectional view of a modified form of automatic reversible modulation valve provided with a secondary valve for by-passing the main modulating valve under predetermined temperature conditions.

As shown in Fig. 1, the automatically reversible modulating valve, indicated generally by the reference character 10, has a body 11 providing a single flow path between the flow inlet pipe 12 and the flow outlet pipe 13 with the relatively movable valvular members 14 and 15 controlling the flow through the single path. These flow controlling valvular members 14 and 15 are of the special through-throw type having a closed position intermediate two open positions so as to automatically reverse the flow modulating action thereof when the valve closure member 14 passes through the valve port member 15. Thus when the closure member 14 moves from the full line position in which it is shown towards the port member 15, the flow is decreased but after the closure member 14 has passed through the port 15 and moves in the same direction towards the position indicated by dotted lines, then the flow is increased. Consequently, opposite flow modulating actions can be obtained upon relative movement of the valvular members 14 and 15 in different ranges in the same direction.

The valve closure member 14 is carried on a stem 16 to be operated through each of the opposite flow modulation ranges by a temperature responsive device 17 or other suitable condition responsive actuating device. As shown, the temperature responsive device 17 is formed by a bellows 18 sealed within an enclosing casing 19 with the sealed space liquid filled and connected by tube 20 with the temperature responsive bulb 21. The bulb 21 also is liquid filled and preferably provided with fins 22 to increase the sensitivity thereof to temperature changes. The casing 19 is sealed to the valve body 11 by means of the clamping nut 24.

The range of operation of valve closure member 14 by the temperature responsive device 17 is selectively limited by a second temperature responsive device 25 or other suitable condition responsive device to either of the opposite flow modulating ranges. As shown, the second temperature responsive device 25 is of the usual type provided with a bellows 26 sealed within the enclosing case 27 with the space therebetween either liquid filled or partially filled with a suitable vaporizable liquid. The enclosing casing 27 is sealed to the valve body 11 by means of the clamping nut 28 so that the second temperature responsive device 25 is thus responsive to the temperature of the medium flowing through the valve 10.

The movable head 30 sealing the free end of bellows 26 carries a tube 31 provided with slots 32 for limiting the motion of the stop 33 carried on the lower end of the valve stem 16. In this way the range of free movement of the valve closure member 14 is limited by the relative position of the tube 31 which is determined by the second temperature responsive device 25. A compression spring 34 is provided within the tube 31 to bias the valve stem 16 so as to tend to move stop 33 towards the upper end of the slot 32. The compression spring 34 also serves to bias the finger 35 carried by casing 36 at the upper end of the valve stem 16 into the depression 37 formed centrally in the head 38 closing the free end of the temperature responsive bellows 18. The relatively stronger spring 39 maintains finger 35 in place and yields only when bellows 18 exerts an abnormal force on finger 35.

*Operation of valve shown in Fig. 1*

While not limited thereto, the improved through-throw valve mechanism 10 in Fig. 1 is particularly advantageous in a year-round temperature control system as shown in Fig. 3 for modulating the flow to a room heating and cooling reversible heat exchanger 40 that is supplied under manual or other suitable control with heated medium in winter and cooled medium in summer. In such service the invention provides an improved single flow path dual thermomotive controlled through-throw reversing valve unit that can regulate the flow of the medium to the reversible heat exchanger 40 reversely in accordance with similar variations in the room temperature in summer and in winter. Thus in maintaining a desired room temperature in winter the valve 10 automatically decreases the flow of the heated medium to the heat exchanger 40 as the room temperature increases within a desired heating control range and vice versa, but when cooled medium is supplied to the heat exchanger 40 in summer, the room temperature responsive thermomotive valve actuating device automatically reverses its thermostatic flow regulating action so as to increase the flow of cooled medium to the heat exchanger as the room temperature increases within a desired cooling control range and vice versa.

In the wintertime, heated medium is supplied to the room unit 40 when valve 41 is opened. Under these conditions, the temperature responsive device 25 responds to the temperature of the heated medium and contracts bellows 26 to move the tube 31 to the position in which it is shown in Fig. 1. The bulb 21 of the temperature responsive device 17 is shown located in the path of the room air passing to the heat exchanger 40 and consequently is responsive to the room air temperature. Suitable heat insulation, not shown, is provided for rendering the bulb 21 insensitive to the temperature of the heat exchanger 40 itself.

With the valve parts in their relative position, indicated in Fig. 1, a substantial flow of heated medium will be supplied to the heat exchanger 40 to control the room air temperature. In case the room air temperature increases, the liquid in bulb 21 will expand and thus contract bellows 18 to move the valve 14 and stem 16 downwardly against the bias of the compression spring 34 to reduce the flow of heated medium to the heat exchanger. But in case the room air temperature decreases, the flow will be increased by reverse action of device 17. In this way the valve closure member 14 will be positioned relative to the port 15 so as to modulate the flow of heated medium to the heat exchanger 40 to balance the heat loss from the room. Thus in very cold weather the valve closure member 14 will be moved upwardly away from the port 15 while in mild weather the valve closure member 14 will be moved closer to the port 15.

If, due to some extraneous cause, the room air temperature should increase during heating operation above a predetermined value, then the valve closure member 14 will be positioned to substantially close the port except for the leakage due to the running clearance provided between the valve closure member 14 and the valve port 15. Under these conditions the stop pin 33 will engage with the lower end of the slot 32 so as to limit further movement of the valve closure member 14 through the cooperating port member 15 within the neutral range N indicated in Fig. 2. The valve port member 15 is formed to maintain the single flow path through the valve 10 closed except for leakage as long as the valve closure member 14 is within the neutral range N, indicated in Fig. 2, which separates the heating control range H from the cooling control range C. The leakage keeps device 25 sensitive to the temperature of the medium flowing through valve 10. Thus throughout the heating control range, indicated schematically by the reference character H in Fig. 2, the valve closure member 14 will be operated to reduce the flow of heated medium when the room temperature increases and vice versa.

In summer when cooled medium is supplied to the heat exchanger 40 by opening of the manually operated valve 42, then the room temperature will normally be at a relatively high value such that bellows 18 will be compressed so as to tend to move the valve closure member 14 into the cooling control range C. The temperature responsive device 25 will respond to the relatively low temperature of the cooled medium to move the tube 31 and position the slot 32 to permit movement of the stop 33 and the valve closure member 14 from the neutral range N into the cooling control range C. Within the cooling range C an increase in the room air temperature will cause a compression of the bellows 18 to move the valve closure member 14 away from the valve port member 15 so as to increase the flow of the cooled medium. Conversely when the cooling effect of the cooled medium supplied to the heat exchanger 40 serves to reduce the room air temperature, then the valve closure member 14 will be moved towards the valve port 15 to reduce the flow of cooled medium. But when the valve closure member 14 enters into the neutral range N within the valve port member 15, then stop 33 will engage with the top of slot 32 to prevent further movement of the valve closure member 14 through the valve port member 15 into the heating range H.

Thus it will be seen that the medium temperature responsive device 25 serves to limit the modulating movements of valve closure member 14 from both the heating range H and the cooling range C so as to prevent the valve closure member 14 from passing through the valve port member 15 into the opposite range. The particular room air temperature values required to close the valve 10 and to fully open the valve in both the heating and cooling ranges is determined by manual adjustment of the knob 43. This adjustment knob operates through a safety spring 44 to compress bellows 45 which is liquid filled and interconnected with the bulb 21 and the liquid filled bellows 18. The safety spring 44 serves as an excess pressure relief spring to permit the liquid filled bellows 45 to expand in case bulb 21 should become subjected to an excessive temperature.

The valve port member 15 in the preferred form shown is removably supported in the valve body 11 by means of the holding down screws 46. Thus in case it should be desired to change the width of the neutral zone N between the heating control range H and the cooling control range C, a different port member 15 providing a neutral range N of greater or lesser width can be substituted. Also the medium temperature responsive device 25 can be changed so as to vary the limits of both the heating range H and the cooling range C as desired by variation in the length of slot 32 as well as the responsiveness of the bellows 26.

In the modified form of automatically reversible modulation valve shown in Fig. 4, the valve closure member 14a cooperates with the port 15a formed in the partition 50 dividing the valve body 51 so as to modulate the flow between the valve inlet pipe 12 and the valve outlet pipe 13. The stem 52 carries the valve closure member 14a and extends through suitable openings formed in the spring arms 53 and 54 which engage respectively with the stops 55 and 56 fixed on the valve stem 52. The motion amplifying spring arm 53 is mounted on a suitable bearing shaft 57 to engage with the push rod 58 of the room temperature responsive bellows 18. The biasing spring arm 54 is carried by a stop member 60 which is pivotally mounted on a suitable bearing shaft 61 and connected by the pin 62 to be operated with a motion amplifying action by the push rod 63 of the bellows 26 that is responsive to the temperature of the medium flowing through the valve.

The auxiliary by-pass valve closure members 64 and 65 are carried on the push rod 63 in spaced apart cooperating relation with the by-pass port 66 formed in the partition 50. These auxiliary valve closure members 64 and 65 occupy substantially their respective open positions in which they are shown when the medium temperature responsive bellows 26 is subjected to temperatures within a predetermined range intermediate the normal heating and cooling temperatures of the medium. When the valve is used in controlling the flow of room heating and cooling medium, the temperature of the heating medium practically always will be above 100° F. while the temperature of the cooling medium will always be below 70° F. Thus when the medium is within the range 100° F. to 70° F., the by-pass port 66 will be opened. When the medium temperature falls below 70° F., then the auxiliary valve closure member 65 will be moved by bellows 26 to substantially close the by-pass port 66. But when the temperature of the medium is above 100° F., then bellows 66 will move the auxiliary valve closure member 64 to substantially close the by-pass port 66.

*Operation of valve shown in Fig. 4*

When the modified form of valve 12 shown in Fig. 4 is used in the room heating and cooling system shown in Fig. 3 and cooling medium is supplied to the room heat exchange unit 40 by manual or automatic opening of the valve 42, the cooling medium can circulate freely through the open by-pass port 66 until the bellows 26 senses the temperature of the cooling medium and contracts to move the auxiliary closure member 65 to substantially close the by-pass port 66. If now the liquid in the room temperature responsive bulb 21 senses an increase in room temperature and contracts bellows 18, then force is transmitted through the push rod 58 and the spring arm 53 to move the main modulating valve closure member 14a to open the port 15a. To effect this movement the spring arm 53 is strong enough to overcome the opposing biasing force of the weaker spring arm 54 and cause the latter to yield and move closer to the stop arm 60. In case the room temperature further increases, the main modulating valve closure member 14a is moved further downward to increase the flow of cooling medium through the port 15a. Thus during cooling operation the valve member 14a is positioned to modulate the flow of cooling medium so as to balance the heat gain of the room and thus maintain the temperature thereof within a desired cooling range. In case there is little, if any, heat gain, then the main modulating valve closure member 14a will substantially close the port 15a so as to stop the flow of cooling medium to the room heat exchange unit 40. Under these conditions with little, if any, flow of cooling medium through the valve body 51, the temperature of the medium within the valve body will tend to approach room temperature. However, as soon as the medium in the valve body 51 reaches a temperature above 70° F., then bellows 26 will respond to open the auxiliary valve closure member 65 and thereby produce a flow of cooling medium through the by-pass port 66. In this way the temperature of the medium within the valve body 51 will automatically be prevented from reaching room temperature due to the restricted flow through the by-pass port 66.

In case heating of the room is required heating medium is supplied to the room heat exchange unit 40 by opening the valve 41. Thereupon the bellows 26 responds to the increased temperature of the heating medium to move the auxiliary valve closure member 64 to substantially close the by-pass port 66. This movement also serves to move the stop arm 60 to strain the spring 54 until the stop arm 60 engages with the stop 56 when by-pass port 66 is substantially closed by member 64. This occurs when the temperature of the heating medium within the valve body 51 exceeds 100° F. If now the room temperature should decrease, then bellows 18 responds to raise push rod 58 so that the increased strain imparted to spring 54 by the expansion of bellows 26 can move valve closure member 14a as well as the spring arm 53 so as to open the port 15a to increase the flow of heating medium to the room heat exchange unit 40. In this way the valve member 14a is positioned to reversely modulate the flow of heating medium so as to balance the heat loss of the room and thereby maintain a room temperature within the desired heating control range. In case there is little, if any, heat loss, then the valve closure member 14a will substantially close the port 15a. As a result when the valve casing 51 approaches room temperature, bellows 26 will respond to move the auxiliary closure member 64 to slightly open the by-pass 66 and thereby permit sufficient flow of the heated medium to maintain the temperature of the medium within the valve body 51 above 100° F. However, under these conditions stop arm 60 still is sufficiently close to the stop 56 that the main modulating member 14a is prevented from moving downwardly and thereby opening the port 15a. Thus the stop arm 60 effectively prevents bellows 18 from moving the main modulating valve 14a into the cooling control range in response to any temporarily excessive temperature in the room when the room heat exchange unit 40 is being supplied with the heating medium.

What I claim as new and desire to secure by Letters Patent of the United States is:

1. An automatic inverse modulation valve having an inlet and an outlet and having in combination two relatively movable valvular members, one having a port and the other relatively movable from each side toward, through, and away from said port to provide inverse flow regulation for controlling the flow of fluid from said inlet to said outlet, and a pair of separate condition responsive devices, one having connections for effecting said relative movement of said members on each side of said port and the other having connections for preventing said relative movement on one side of said port.

2. An automatic inverse modulation valve having an inlet and an outlet and having in combination relatively movable through-throw valvular members having a relatively closed position intermediate a pair of open positions for controlling the flow of fluid from said inlet to said outlet, and a pair of condition responsive devices, one having connections for effecting relative movement of said members each way between said pair of open positions, and the other having connections for preventing said relative movement between said relatively closed position and one of said open positions.

3. An automatic inverse regulation valve having an inlet and an outlet for the flow of fluid therethrough and having in combination two relatively movable through-throw valvular members for providing a valve closing position between two fluid flow controlling ranges, and a pair of separate condition responsive devices one having connections for effecting similar relative movement of said members in each of said flow controlling ranges upon opposite variation of a predetermined condition and the other having connections for preventing said relative movement from said closing position to one of said ranges under a predetermined condition.

4. An automatic modulation valve having an inlet, an outlet, a restricted flow passage therebetween, a valve relatively movable each way toward, through, and away from said passage for oppositely varying the flow in two different ranges of relative movement, and a pair of temperature responsive devices, one having connections for effecting said relative movement of said members in each range and the other having connections for preventing said relative movement in one of said ranges.

5. An automatic inverse modulation valve having in combination relatively movable valvular members, one having a port and the other mounted for reciprocation from each side toward, through, and away from said port to provide inverse flow regulation on opposite sides of said port and a pair of temperature responsive devices disposed on opposite sides of said port, one having yielding connections for effecting said relative movement of said members and the other responsive to the temperature of the medium controlled by said valve and having a stop operated thereby for selectively preventing said relative movement on one side of said port when the temperature of said medium reaches a predetermined value.

6. An automatic valve having in combination relatively reciprocative through-throw valvular members having a relatively closed position intermediate a pair of open positions, a by-pass valve, and a pair of temperature responsive devices, one having connections for effecting relative reciprocative movement of said members each way between said pair of open positions, and the other responsive to the temperature of the medium controlled by said valve and having connections for selectively closing said by-pass valve and preventing said relative movement of said valvular members between said relatively closed position and one of said pair of open positions.

7. An automatically reversible modulation valve having in combination an inlet, an outlet, means providing a pair of restricted flow passages therebetween, a through-throw valve relatively reciprocative each way towards, through, and away from one of said passages for inversely regulating the flow in two different ranges of relative movement, a pair of valve closure members for closing the other of said passages, and a pair of temperature responsive devices, one having connections for effecting said relative movement of said through-throw valve in each range and the other responsive to the temperature of the medium controlled by said valve and having connections for selectively operating said closure members to close said other passage and simultaneously limiting said relative movement of said through-throw valve to one of said ranges.

8. An automatic regulating valve having in combination a valve body having an inlet and an outlet and a partition extending therebetween and provided with a pair of valve ports, a first relatively movable through-throw valvular member cooperating with one of said ports for providing a valve closing range between two valve opening ranges, a pair of interconnected valvular members for separately closing the other of said ports and a pair of temperature responsive devices one having connections for effecting relative movement of said first valvular member in each of said opening ranges and the other responsive to the temperature of the medium controlled by said valve and having connections for operating said pair of valvular members and for limiting said relative movement from said closing range to one of said opening ranges.

SAMUEL J. LEVINE.

REFERENCES CITED

The following references are of record in the file of this patent:

UNITED STATES PATENTS

| Number | Name | Date |
|---|---|---|
| 1,771,170 | Eule | July 22, 1930 |
| 2,353,889 | Giesler | July 18, 1944 |